United States Patent

Serizawa

(10) Patent No.: US 6,715,909 B2
(45) Date of Patent: Apr. 6, 2004

(54) VEHICLE LAMP

(75) Inventor: Tomoaki Serizawa, Shimizu (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 10/263,561

(22) Filed: Oct. 3, 2002

(65) Prior Publication Data

US 2003/0067787 A1 Apr. 10, 2003

(30) Foreign Application Priority Data

Oct. 4, 2001 (JP) ............................ 2001-308482

(51) Int. Cl.7 .................................................. F21S 8/10
(52) U.S. Cl. ..................... 362/545; 362/544; 362/546; 362/541; 362/362
(58) Field of Search ............................. 362/543, 544, 362/545, 546, 541, 540, 362, 368, 800

(56) References Cited

U.S. PATENT DOCUMENTS

| | | | |
|---|---|---|---|
| 4,845,600 A | 7/1989 | Matsumura et al. | |
| 5,038,255 A | * 8/1991 | Nishihashi et al. | ......... 362/547 |
| 5,050,051 A | 9/1991 | Machida et al. | |
| 5,700,080 A | 12/1997 | Okuda | |
| 5,746,497 A | 5/1998 | Machida | |

FOREIGN PATENT DOCUMENTS

| | | |
|---|---|---|
| EP | 1 178 706 | 7/2001 |
| EP | 1 262 368 | 5/2002 |
| JP | 4-51404 | 2/1992 |
| JP | 7-246875 | 9/1995 |

* cited by examiner

Primary Examiner—Laura K. Tso
(74) Attorney, Agent, or Firm—Koda & Androlia

(57) ABSTRACT

A vehicle lamp including a light-emitting diode and a lighting circuit for the light-emitting diode, a lamp chamber defined by a lamp body and a lens that covers the front of the lamp body, an LED circuit board which is disposed in the lamp chamber and on which the light-emitting diode and the lighting circuit are provided, and a cord for connecting the LED circuit board to an electric power supply; and in addition a limiting resistor for limiting a supply current for the light-emitting diode being provided on a part of the cord that is located outside the lamp chamber.

16 Claims, 4 Drawing Sheets

VEHICLE LAMP

BACKGROUND OF THE INVENTION

1. Field of the Invention

The present invention relates to a vehicle lamp and more particularly to a vehicle lamp that uses light-emitting diode as a light source thereof.

2. Prior Art

One type of a vehicle lamp uses a light-emitting diode as its light source. A light-emitting diode (LED) has several advantages. Compared to an incandescent bulb, the light-emitting diode is small and lightweight, its electric power consumption is low, and a heat generation amount is small. The light-emitting diode has another advantage. The time period between the electric current is supplied and the highest luminous intensity is reached is short compared to the incandescent bulb.

Accordingly, when the light-emitting diode is employed in a stop lamp for an automobile, it works well in response to the braking operation and thus contributes to a traffic safety.

In addition, since the light-emitting diode is small in heat generation, even when it is disposed in a small-volume light chamber, it has no thermal effect on a lamp body and a lens. As a result, not much consideration is needed to be given to the heat resistance in terms of the materials and the shapes of the lamp body and lens, and also the flexibility in design including selection of the materials is fairly high.

Meanwhile, a so-called high mount stop lamp is a vehicle lamp that uses the above-described advantages of the light emitting diode. The high mount stop lamp is disposed on the inner side of the rear windshield of an automobile.

In such a high mount stop lamp, the lamp chamber, that is defined by a lamp body and a lens covering the front of the lamp body, is generally shallow in the longitudinal direction and long in the lateral direction, and its vertical length (height) is small. Inside the lamp chamber is provided with an LED circuit board that has light-emitting diodes disposed in the lateral direction on its front side, and a lighting circuit is also provided on the LED circuit board.

As described above, with the use of the light-emitting diode as a light source, it is possible to configure a preferable vehicle lamp. In other words, the temperature in the lamp chamber can be prevented from becoming too high even if the lamp chamber is shallow in the longitudinal direction and small in the height. Also, such a vehicle lamp can be installed in the interior of an automobile that has a limited space.

Meanwhile, an electric power supply (a battery) used in an automobile is a 24V- or 12V-battery. Accordingly, a limiting resistor for limiting the current to be supplied to the light-emitting diode is required in a circuit which is for lighting the light-emitting diode.

FIG. 6 shows one example of a circuit a for lighting light-emitting diodes.

In this lighting circuit a, a ground terminal GND as an electric power supply terminal, an electric power supply terminal STOP for a stop, and an electric power supply terminal TAIL for a tail are provided. A light-emitting diode block d formed by connecting a plurality of light-emitting diode groups b in series is connected to an electric power supply line c that connects the terminals GND and STOP. Each of the light-emitting diode groups b is formed by connecting a plurality of light-emitting diodes LED. In addition, a protective circuit e is provided parallel to the light-emitting diode block d. Also, a tail control circuit f for reducing the luminous intensity of the light-emitting diodes LED is disposed between the terminal TAIL and the input side contact point of the light-emitting diode block d. The reference numerals D1 and D2 in FIG. 6 are diodes for preventing backflow.

The thus structured lighting circuit a is provided on a print circuit board (an LED circuit board). Each of the terminals STOP and TAIL and a battery (not shown) are connected by cords g and h, and the terminal GND is grounded using a cord i. Switches (not shown) are provided on the cords g and h.

Each of the resistors RS for current regulation is a surface mounting type resistor, and it is installed on the LED circuit board. All the resistors RS are divided into a plurality of resistor groups j, and each of the resistor groups j is formed by connecting a plurality of resistors RS in parallel. These resistor groups j are provided between the light-emitting diode groups b and connected to the light-emitting diode groups b in series.

The light-emitting diodes LED are mounted on the front surface of the LED circuit board; in other words, they are provided on the surface that faces the lens of the stop lamp. The resistors RS, on the other hand, are mounted on the rear surface of the LED circuit board. When a transparent and colorless clear lens is used, the inside of the lamp chamber can be seen to its detail. Therefore, in consideration of appearance, it is preferable that the resistors RS be provided on the rear side of the LED circuit board. It is also preferable to use surface mounting type resistors that have terminals not projecting from the front surface.

Despite the structure described above, since the surface mounting type resistors RS do not have a large electric capacity, the problem is that the number of the resistors RS to be mounted on the LED circuit board tends to be large.

When a large number of the resistors RS are mounted on the LED circuit board, another problem rises. The size of the LED circuit board needs to be large, and this hinders the size reduction of the lamp.

In addition, the resistors RS generate heat and the number thereof becomes larger, the entire heat generation amount on the LED circuit board becomes larger, thus reducing the luminous intensity of the light-emitting diode LED by the heat. Accordingly, it is necessary to increase the number of light-emitting diode LED, which hinders the size reduction of the lamp.

Further, when the resistors RS are mounted on the LED circuit board and the number thereof becomes larger, the parts cost and mounting cost increases, and the cost of the lamp also increases.

SUMMARY OF THE INVENTION

Accordingly, the object of the present invention is to provide a lamp structure in which a current limiting resistor is provided independently of an LED circuit board, thus resolving various problems that result from current limiting resistors mounted on the LED circuit board.

The above object is accomplished by a unique structure for a vehicle lamp that includes a lamp chamber defined by a lamp body and a lens that covers the front of the lamp body, an LED circuit board which is disposed inside the lamp chamber and on which a light-emitting diode is mounted and the lighting circuit is formed, and a cord for connecting the LED circuit board to an electric power supply; and in the present invention, a limiting resistor for limiting the supply current for the light-emitting diode is provided on a part of the cord that is located outside the lamp chamber.

In the above structure of the present invention, the limiting resistor is not mounted on the LED circuit board. Accordingly, it is possible to avoid the size increase of the LED circuit board and avoid the efficiency drop of the light-emitting diode that is caused by the heat on the LED circuit board.

Also, since the limiting resistor is provided on the cord, it is possible to use a limiting resistor that has a large capacity, and the cost for providing the limiting resistor can be reduced, and thus the costs of the lamps can be reduced.

DETAILED DESCRIPTION OF THE INVENTION

Embodiments of the vehicle lamp according to the present invention will be described below in detail with reference to the accompanying drawings. The following description will be made on a high mount stop lamp for an automobile.

In the high mount stop lamp 1, a print-circuit board (called "an LED circuit board") 5 is disposed in a lamp chamber 4 which is defined by a lamp body 2 and a colorless and transparent lens 3 that covers the front of the lamp body 2. As seen from FIG. 1, the lamp body 2 is laterally long, its vertical width (height) is small, and it is shallow in its depth in the longitudinal direction.

Figure 3:
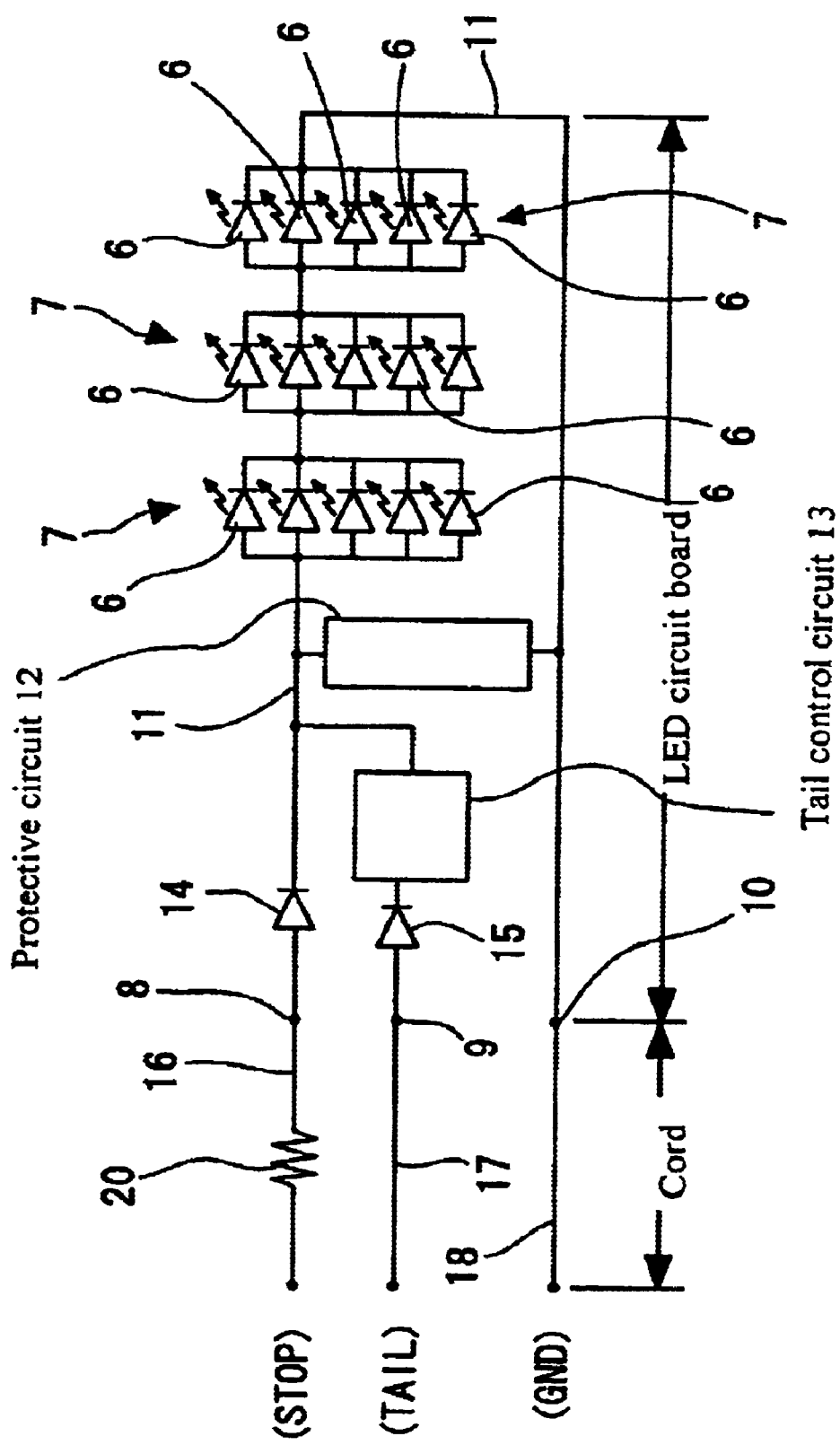
FIG. 3 is a circuit diagram used in the embodiment of the vehicle lamp of the present invention.

On the front surface of the LED circuit board 5, a plurality of light-emitting diodes 6 are arranged and supported in the lateral direction. More specifically, as seen from FIG. 3, a plurality of light-emitting diode groups 7 are connected in series; and each one of the light-emitting diode groups 7 is formed by connecting a plurality of light-emitting diodes 6 in parallel. The light-emitting diodes 6 are colorless when not emitting the light, and they emit red light at the time of light emission.

The LED circuit board 5 includes a main power supply terminal (for a stop) 8, a power supply terminal 9 for a tail, and a ground terminal 10. The light-emitting diode groups 7 are connected in series to a power supply line 11 that connects the main power supply terminal 8 and the ground terminal 10. In addition, a protective circuit 12 is connected to the power supply line 11 so as to be in parallel to the series circuits of the light-emitting diode groups 7. A tail control circuit 13 for reducing the luminous intensity of the light-emitting diodes 6 is provided between the power supply terminal 9 for a tail and the main power supply terminal 8 side of the power supply line 11. The reference numerals 14 and 15 are diodes for backflow prevention. Each of the power supply terminals 8 and 9 and a battery (not shown) are connected by cords 16 and 17. The ground terminal 10 is grounded using a cord 18. On the cords 16 and 17, switch means (not shown) are provided.

Figure 1:
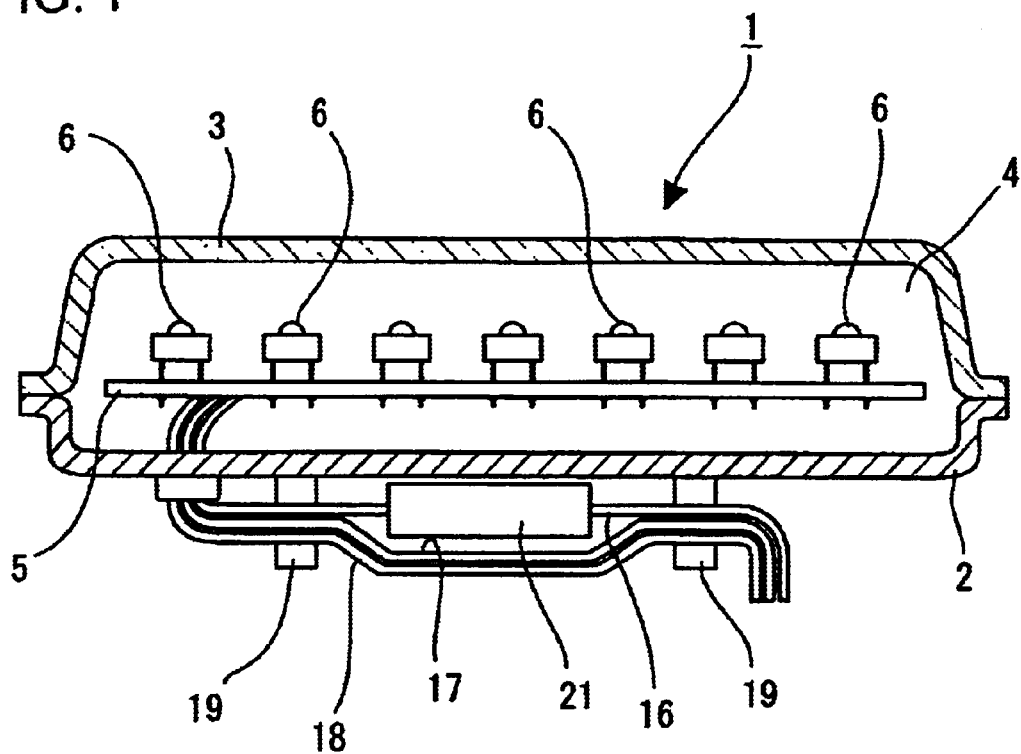
FIG. 1 shows, in horizontal cross section, an embodiment of the vehicle lamp according to the present invention.

The cords 16, 17 and 18 are led out of the lamp chamber 4 from the rear side of the lamp body 2 as seen from FIG. 1. They are held and retained by hook-shaped clampers 19 that project from the back of the lamp body 2 with a space in between in the lateral direction.

Figure 2:
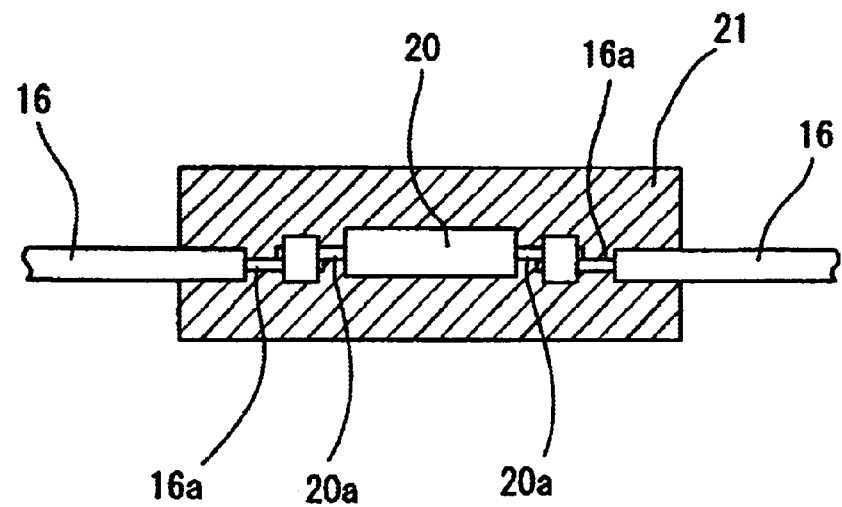
FIG. 2 shows, in an enlarged cross section, a portion of the cord where the limiting resistor is provided.

As best seen from FIG. 2, of the cords described above, the main power supply cord 16 is provided with a resistor 20 for limiting electric currents. Since the limiting resistor 20 is thus not provided on the print-circuit board 5, no limitation is imposed on the size of the limiting resistor 20 by the dimensions of the print-circuit board, that is, the LED circuit board 5 in the shown embodiment, the circuit provided thereon, and the like. Therefore, a resistor having a large capacity can be used. Lead wires 20a of the limiting resistor 20 are connected to core wires 16a of the main power supply cord 16 by appropriate means such as ribbon caulking and soldering.

The limiting resistor 20 in its entirety and connection portions between the resistor 20 and the main power supply cord 16 are covered by a buffer cover body 21. The buffer cover body 21 is employed so as to make the electrically connecting portions (the connecting portion between the lead wires 20a of the resistor 20 and the core wires 16a of the main power supply cord 16) waterproof and to reinforce the mechanical strength thereof. Any covering body can be employed as long as it has adhesiveness with the resistor 20 and the main power supply cord 16, waterproofing properties, and the mechanical strength greater than those of the resistor 20 and the main power supply cord 16. For instance, molding that uses hot melt (polyamide resin), adhesion of a heat contraction tube, or the like can be employed.

Figure 4:
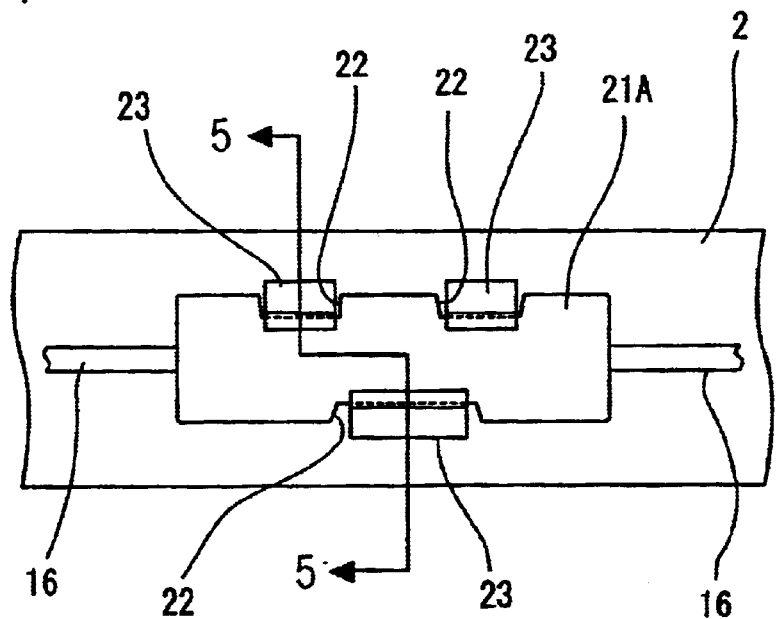
FIG. 4 is a rear view of the main portion of a modified example for holding the resistor portion.
Figure 5:
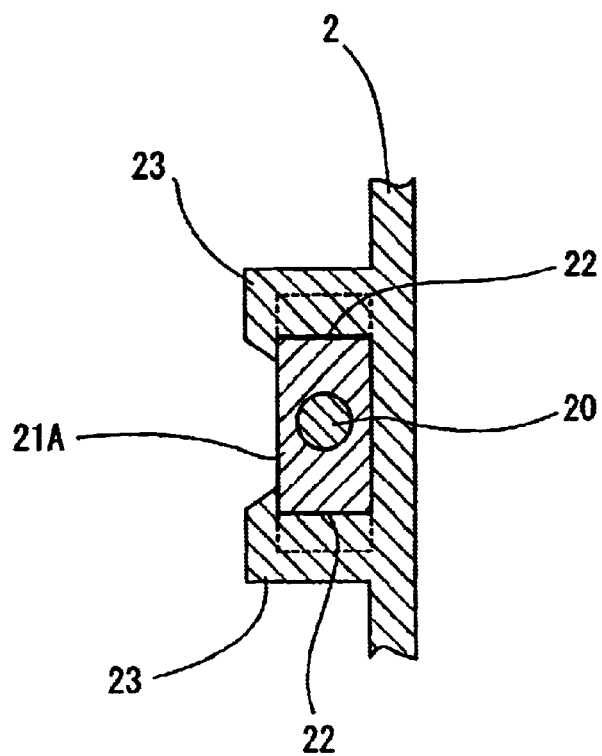
FIG. 5 is a cross section taken along the line 5—5 in FIG. 4.
Figure 6:
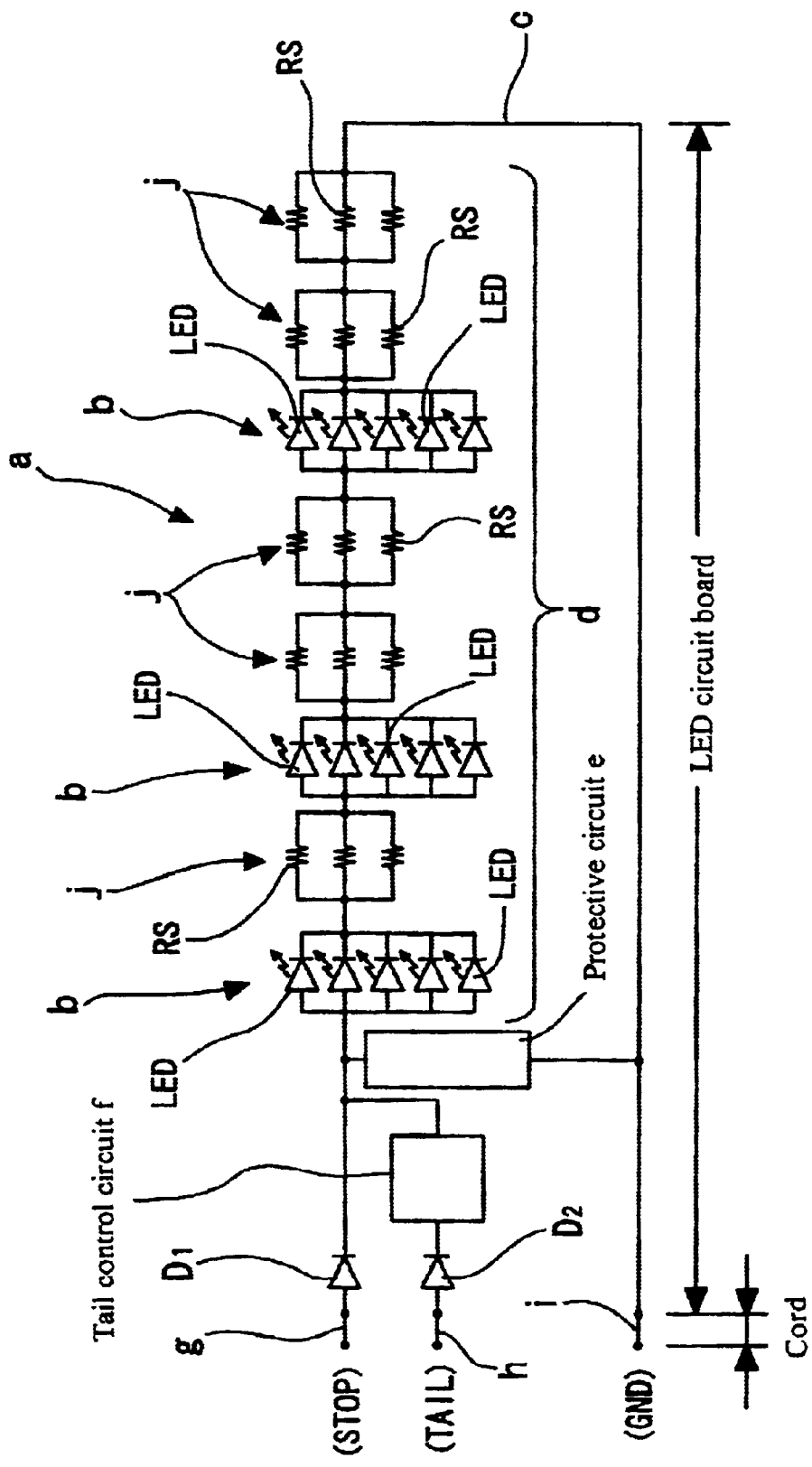
FIG. 6 shows one example of a circuit for lighting the light-emitting diode used in a conventional vehicle lamp.

In the above description, the clampers 19 are used as a means for holding the resistor connecting portion of the cords on the lamp body 2. FIGS. 4 and 5 show another means. In this supporting means in FIGS. 4 and 5, engagement notches 22 are formed in a hot melt molding 21A, and projecting engagement claws 23 are formed on the back of the lamp body 2; and these projecting engagement claws 23 are engaged with the engagement notches 22. In the support structure of FIGS. 4 and 5, a sheet packing (not shown) having a low rebound property can be interposed between the hot melt molding 21A and the back of the lamp body 2. With this sheet packing 24, a noise caused by vibrations during the running of the vehicle can be prevented.

In the high mount stop lamp 1 described above, the electric power is supplied when the switch means (not shown) which is provided on the cord 17 is switched on in response to, for instance, the turning-on operation of a lighting switch of the head lamp, and as a result the light-emitting diodes 6 emit light at a low luminous intensity through the tail control circuit 13. Also, the electric power is supplied via the limiting resistor 20 when the switch means which is provided on the main power supply cord 16 is turned on. The limiting resistor 20 is switched on in response to, for instance, a depressing operation of a brake pedal, and as a result the light-emitting diodes 6 emit light at a high luminous intensity.

In the above high mount stop lamp 1, the limiting resistor 20 for limiting the current to be supplied to the light-emitting diodes 6 is not provided on the LED circuit board 5. Therefore, the luminous efficiency of the light-emitting diodes 6 is not reduced by the heat generated by the limiting resistor, and only the minimum number of light-emitting diodes 6 is required. Therefore, the LED circuit board 5 can be made small in size, and accordingly, it becomes possible to reduce the entire size of the high mount stop lamp 1. In addition, the LED circuit board does not need to have a space for mounting the limiting resistor thereon, and this makes it possible to reduce the size of the LED circuit board 5. Thus, it becomes possible to further reduce the size of the high mount stop lamp 1.

Also, only one limiting resistor that has a large capacity is sufficient to be used. Thus, a trouble in mounting limiting resistors can be eliminated, the parts cost becomes lower, and the high mount stop lamp can be provided at low cost.

Though the present invention is described on the high mount stop lamp for an automobile in the above embodiment, it does not mean that the scope of application of the present invention is limited to high mount stop lamps. The present invention is indeed widely applicable to vehicle lamps which use a light-emitting diode as a light source and in which the light-emitting diode is disposed on a print-circuit board.

Also, in the above embodiment, the lens 3 is colorless and transparent, and the light-emitting diodes 6 emit red light. However, light-emitting diodes that emit white or red light can be used together a lens that is red and transparent.

In addition, the shape and structure of each portion shown in the above-described embodiment is only one example of embodying the present invention, and the technical scope of the present invention should not be limited by such shape and structure.

As is obvious from the above, the vehicle lamp according to the present invention includes: a light-emitting diode and a lighting circuit for the light-emitting diode, a lamp chamber defined by a lamp body and a lens that covers the front of the lamp body, an LED circuit board which is disposed in the lamp chamber and on which the light-emitting diode and the lighting circuit are provided, and a cord for connecting the LED circuit board with an electric power supply; and further a limiting resistor for limiting a supply current for the light-emitting diode is provided on a part of the cord that is located outside the lamp chamber.

Accordingly, since the limiting resistor is not provided on the LED circuit board, it is possible to minimize the size of the LED circuit board and avoid an efficiency drop of the light-emitting diode that is caused by the heat generated on the LED circuit board.

Also, since the limiting resistor is provided on the cord, it becomes possible to use a limiting resistor that has a large capacity, and the cost for providing the limiting resistor becomes can be reduced, which contributes to the reduction in the cost of vehicle lamps.

Since the circuit on the LED circuit board is composed of only the circuit elements and do not include a resistor, the light-emitting diode is not affected by the heat caused by the resistor.

In addition, the limiting resistor is covered by a buffer covering body that has an insulative property. Accordingly, not only is the connecting portion between the limiting resistor and the cord waterproofed, but also the mechanical strength of the connecting portion between the limiting resistor and the cord is increased.

Furthermore, since the limiting resistor is held by the engagement portion formed on the back of the lamp body, the limiting resistor is prevented from moving disorderly due to vibrations during the operation of the vehicle. Thus, it is possible to prevent generation of a noise or damage to the limiting resistor and the like due to collision of the limiting resistor against other constituting elements.

In addition, since the lens is colorless and transparent, and the light-emitting diode emits red light, the LED circuit board that can be seen through the colorless and transparent lens can be made small, and thus, the appearance of the vehicle lamp can be improved.

What is claimed is:

1. A vehicle lamp that includes a light-emitting diode and a lighting circuit for said light-emitting diode, comprising:

a lamp chamber defined by a lamp body and a lens covering a front of said lamp body, an LED circuit board which is disposed inside said lamp chamber and on which said light-emitting diode is mounted and said lighting circuit is formed, and a cord for connecting said LED circuit board to an electric power supply;

wherein a limiting resistor for limiting a supply current for said light-emitting diode is provided on a part of said cord that is located outside said lamp chamber.

2. The vehicle lamp according to claim 1, wherein a circuit formed on said LED circuit board is composed of circuit elements excluding a resistor.

3. The vehicle lamp according to claim 2, wherein said limiting resistor is covered by a buffer covering body that has an insulative property.

4. The vehicle lamp according to claim 3, wherein said limiting resistor is engaged with an engagement portion formed on a back of said lamp body.

5. The vehicle lamp according to claim 4, wherein said lens is transparent and colorless, and said light-emitting diode emits red light.

6. The vehicle lamp according to claim 1, wherein said limiting resistor is covered by a buffer covering body that has an insulative property.

7. The vehicle lamp according to claim 1, wherein said limiting resistor is engaged with an engagement portion formed on a back of said lamp body.

8. The vehicle lamp according to claim 1, wherein said lens is transparent and colorless, and said light-emitting diode emits red light.

9. The vehicle lamp according to claim 2, wherein said limiting resistor is engaged with an engagement portion formed on a back of said lamp body.

10. The vehicle lamp according to claim 9, wherein said lens is transparent and colorless, and said light-emitting diode emits red light.

11. The vehicle lamp according to claim 2, wherein said lens is transparent and colorless, and said light-emitting diode emits red light.

12. The vehicle lamp according to claim 3, wherein said lens is transparent and colorless, and said light-emitting diode emits red light.

13. The vehicle lamp according to claim 6, wherein said limiting resistor is engaged with an engagement portion formed on a back of said lamp body.

14. The vehicle lamp according to claim 13, wherein said lens is transparent and colorless, and said light-emitting diode emits red light.

15. The vehicle lamp according to claim 6, wherein said lens is transparent and colorless, and said light-emitting diode emits red light.

16. The vehicle lamp according to claim 7, wherein said lens is transparent and colorless, and said light-emitting diode emits red light.

* * * * *